L. E. SAUNDERS.
METHOD OF PREPARING BARIUM OXID.
Reissued June 8, 1915. APPLICATION FILED APR. 28, 1915. 13,924.
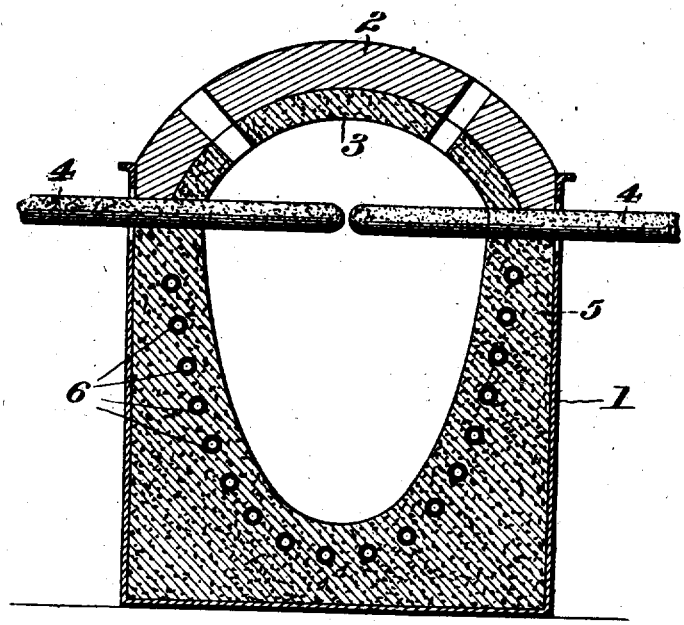
WITNESSES
C. M. Walker
R. S. Hulsizer.
INVENTOR,
Lewis E. Saunders,
by Byrnes, Townsend & Brickenstein
Attorneys.

UNITED STATES PATENT OFFICE.

LEWIS E. SAUNDERS, OF NIAGARA FALLS, NEW YORK.

METHOD OF PREPARING BARIUM OXID.

13,924. Specification of Reissued Letters Patent. Reissued June 8, 1915.

Original No. 1,112,721, dated October 6, 1914, Serial No. 675,675. Application for reissue filed April 28, 1915. Serial No. 24,622.

*To all whom it may concern:*

Be it known that I, LEWIS E. SAUNDERS, a citizen of the United States, residing at Niagara Falls, in the county of Niagara and State of New York, have invented certain new and useful Improvements in Methods of Preparing Barium Oxid, of which the following is a specification.

This invention relates to the manufacture, in an electric or other furnace affording sufficient temperatures, of barium oxid or mixtures containing barium oxid in available form, said mixtures free from commercially objectionable proportions of barium sulfid or other reduction products.

Native barium sulfate, or barytes, has heretofore been reduced in the electric furnace in presence of carbon or under reducing conditions, yielding products which contain the oxid and sulfid of barium. I have discovered that under proper conditions it is possible to eliminate sulfur and oxygen from barium sulfate, usually the native sulfate, and thereby to produce barium oxid free or commercially free from barium sulfid and other reduction products. The essential conditions are a sufficient temperature, which should be at least 1500° centigrade and preferably 1600° centigrade or higher, and the maintenance of non-reducing conditions. It is important that no carbon or reducing gases should be permitted in contact with the charge, as such agents result in the formation of certain percentages of barium sulfid, which it is especially desired to avoid. Any method of heating which will afford the necessary conditions may be used. A convenient method of working is under a reflected electric arc, care being taken that the carbon electrodes, if used, do not contact with the bath. The furnace may be lined with barium sulfate, the outer portion being water-cooled to prevent fusion. Under these conditions a product may be made containing 75% or more of barium oxid, the balance consisting chiefly of unconverted sulfate and such impurities of the original charge as the oxids of iron, aluminum and silicon. The product is characterized by the absence of any substantial or commercially objectionable proportion of reduction products, including barium sulfid. The gases evolved consist mainly of sulfur trioxid, or sulfur dioxid and oxygen, or mixtures of these. The barium oxid is readily recovered from the product of the fusion by leaching.

A furnace suitable for carrying the invention into effect is shown in the accompanying drawing, wherein the figure is a central vertical section.

In said figure, 1 represents the furnace shell of metal, lined with barium sulfate 5 in conjunction with a suitable binder as sodium silicate.

2 is a fire-brick cover, and 3 a highly refractory reflecting surface therefor, preferably consisting of silicon carbid.

4 are the carbon electrodes, maintained out of contact with the bath.

6 represents a coil of iron pipe disposed in the lining 5 and adapted for the circulation of water.

I claim:—

1. The method of preparing barium oxid, which consists in heating barium sulfate to its temperature of decomposition under non-reducing conditions.

2. The method of preparing barium oxid, which consists in electrically heating barium sulfate to its temperature of decomposition under non-reducing conditions.

3. The method of preparing barium oxid, which consists in decomposing barium sulfate under non-reducing conditions by the heat of an electric arc maintained out of contact therewith.

In testimony whereof I affix my signature in presence of two witnesses.

LEWIS E. SAUNDERS.

Witnesses:
NEIL A. WILSON,
G. T. REICH.